(12) United States Patent
Hsieh et al.

(10) Patent No.: US 8,358,777 B2
(45) Date of Patent: Jan. 22, 2013

(54) WIRELESS TELEPHONE HAVING SUPPORT WITH BUILT-IN ANTENNA

(75) Inventors: Kun-Chih Hsieh, New Taipei (TW); Chia-Min Wang, New Taipei (TW); Tong-You Quan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 82 days.

(21) Appl. No.: 13/159,429

(22) Filed: Jun. 14, 2011

(65) Prior Publication Data
US 2012/0170736 A1 Jul. 5, 2012

(30) Foreign Application Priority Data
Dec. 30, 2010 (CN) .......................... 2010 1 0614481

(51) Int. Cl.
*H04M 1/00* (2006.01)
*H04M 9/00* (2006.01)

(52) U.S. Cl. ................. 379/428.04; 379/446; 455/575.1
(58) Field of Classification Search ............ 379/428.01, 379/428, 441, 446, 44, 449, 454; 455/90.3, 455/575.1, 575.5, 575.7; 343/702, 720, 904
See application file for complete search history.

(56) References Cited

U.S. PATENT DOCUMENTS

| | | | | |
|---|---|---|---|---|
| 5,535,274 | A * | 7/1996 | Braitberg et al. | 379/446 |
| 5,889,859 | A * | 3/1999 | Lundell et al. | 379/428.04 |
| 6,134,421 | A * | 10/2000 | Lee et al. | 455/575.9 |
| 2003/0186727 | A1 * | 10/2003 | Gurner | 455/575.1 |
| 2008/0150815 | A1 * | 6/2008 | Nakahata et al. | 343/718 |

* cited by examiner

*Primary Examiner* — Tuan D Nguyen
(74) *Attorney, Agent, or Firm* — Altis Law Group, Inc.

(57) ABSTRACT

A wireless telephone includes a support and a base unit supported by the support. The support includes an antenna and defines a number of through holes. The antenna includes a number of electrically conductive pins that are aligned with the through holes. The base unit includes a number of protruding, conductive terminals that respectively pass through the through holes and contact the electrically conductive pins to allow signals to be transmitted through the antenna.

5 Claims, 6 Drawing Sheets

WIRELESS TELEPHONE HAVING SUPPORT WITH BUILT-IN ANTENNA

BACKGROUND

1. Technical Field

The present disclosure relates to telephones, especially to a wireless telephone having a support with an antenna built into the support.

2. Description of Related Art

Wireless communication apparatuses include an antenna to send or receive signals. Generally, the antennas of wireless telephones are built into a base unit of the telephones. However, electro-magnetic radiation of electronic components in the telephones may negatively impact functioning of the antennas.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
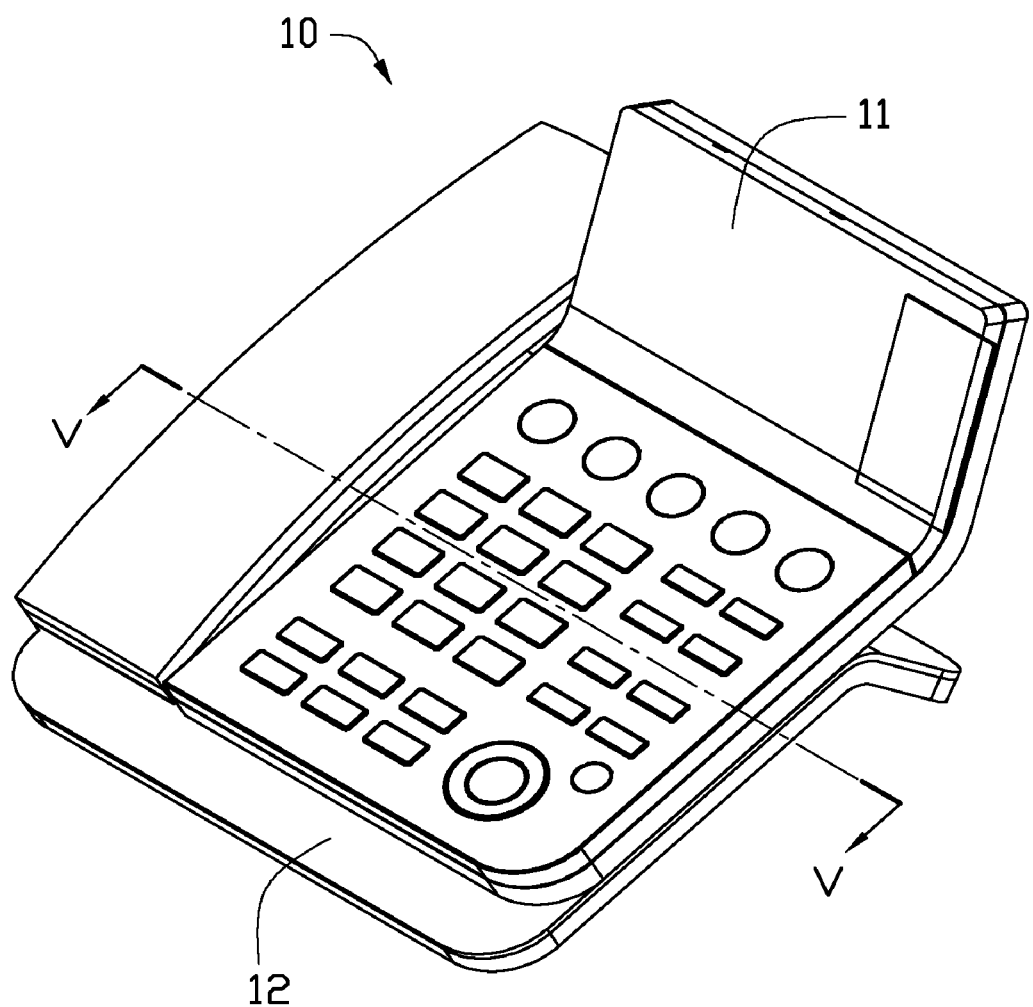
FIG. 1 is an isometric view of a wireless telephone according to an exemplary embodiment.

Referring to FIG. 1, a wireless telephone 10 according to an exemplary embodiment includes a support 12 and a base unit 11 supported by the support 12.

Figure 2:
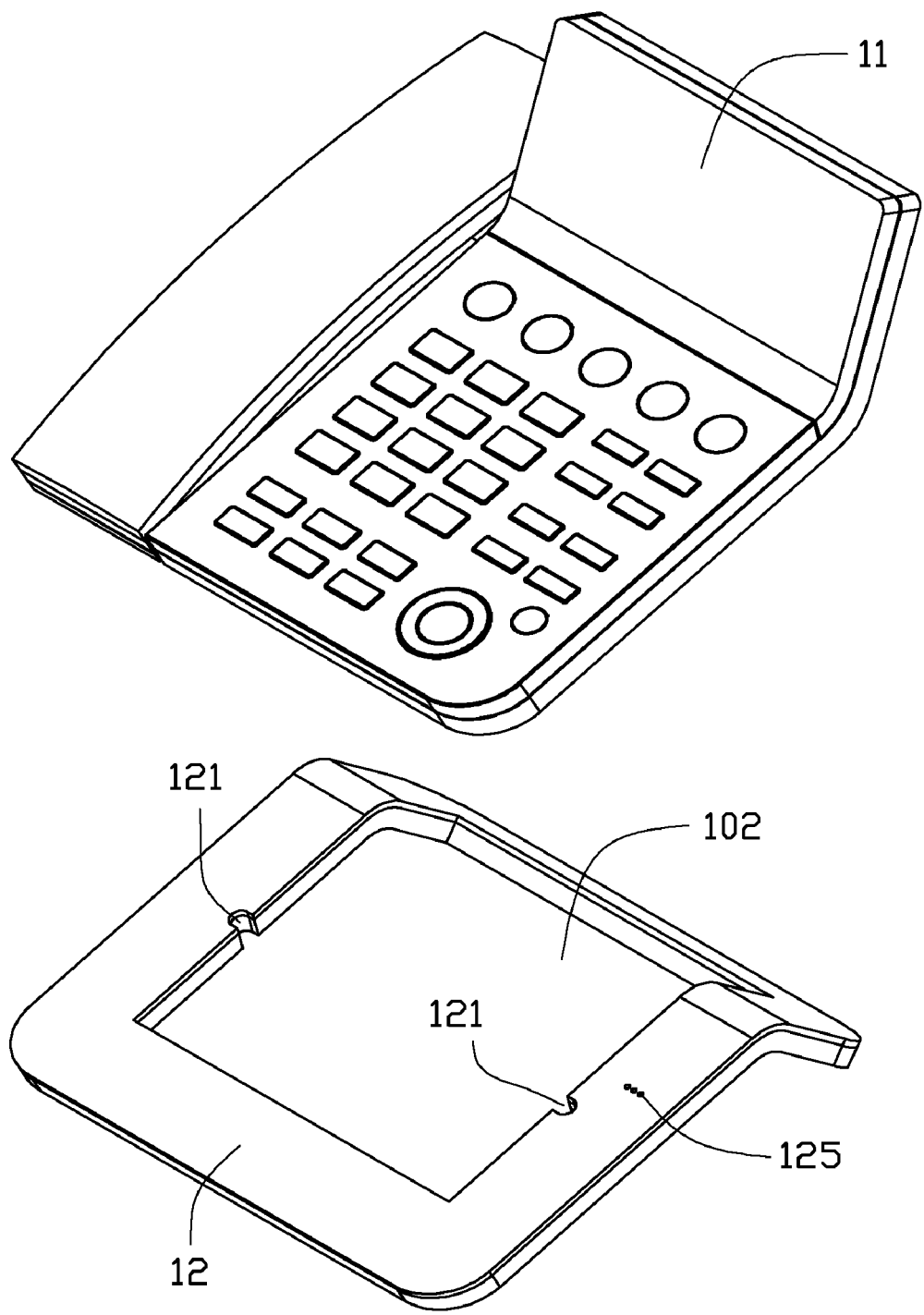
FIG. 2 is an exploded view of the wireless telephone of FIG. 1.
Figure 3:
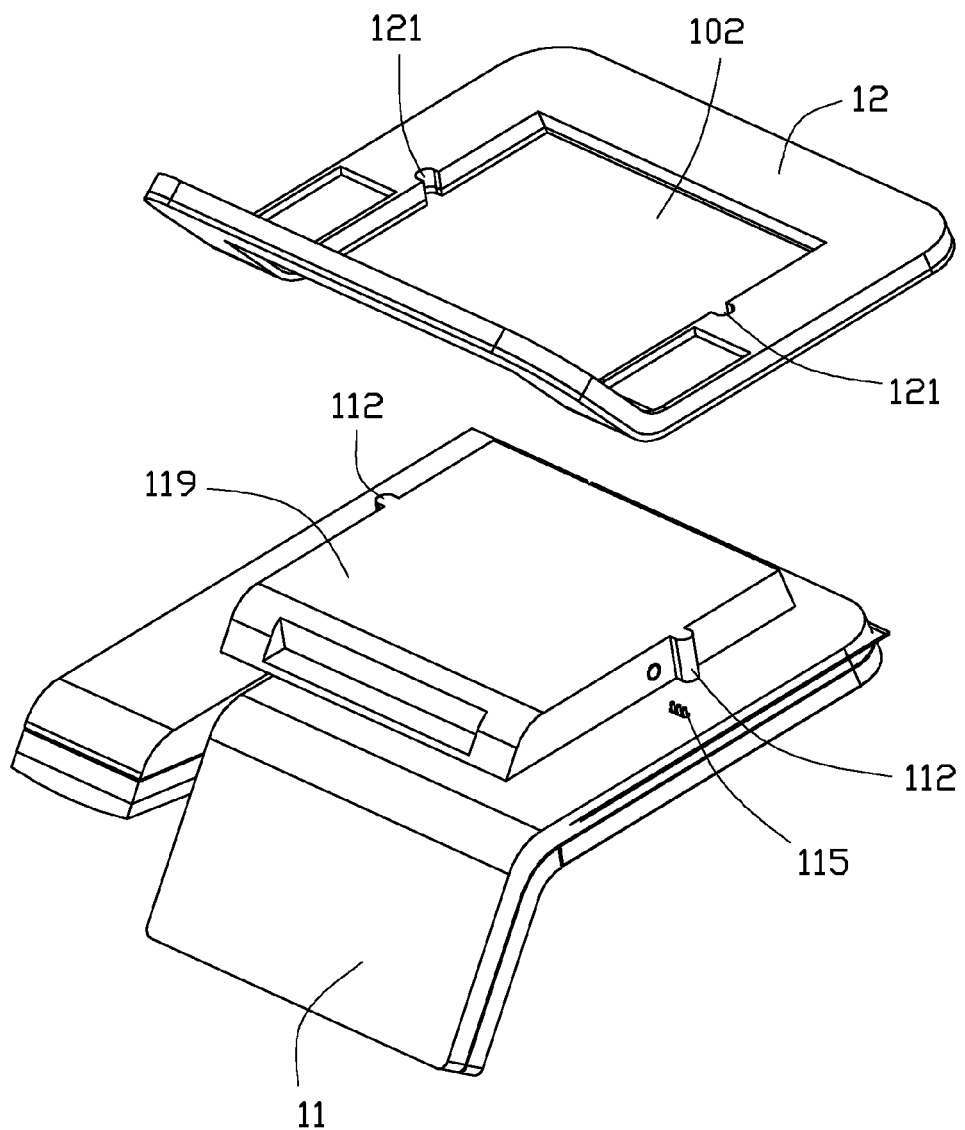
FIG. 3 is similar to FIG. 2, but viewed from a different viewpoint.

Referring to FIGS. 2 and 3, the base unit 11 is formed with a platform 119 protruding from its bottom. The support 12 defines a receiving space 102 for receiving the platform 119. Two opposite sides of the platform 119 respectively include a protrusion 112. The support 12 defines two opposite recesses 121 in opposite sidewalls of the receiving space 102. The two protrusions 112 are received in the two recesses 121 in a transition fit to fix the base unit 11 to the support 12.

Figure 4:
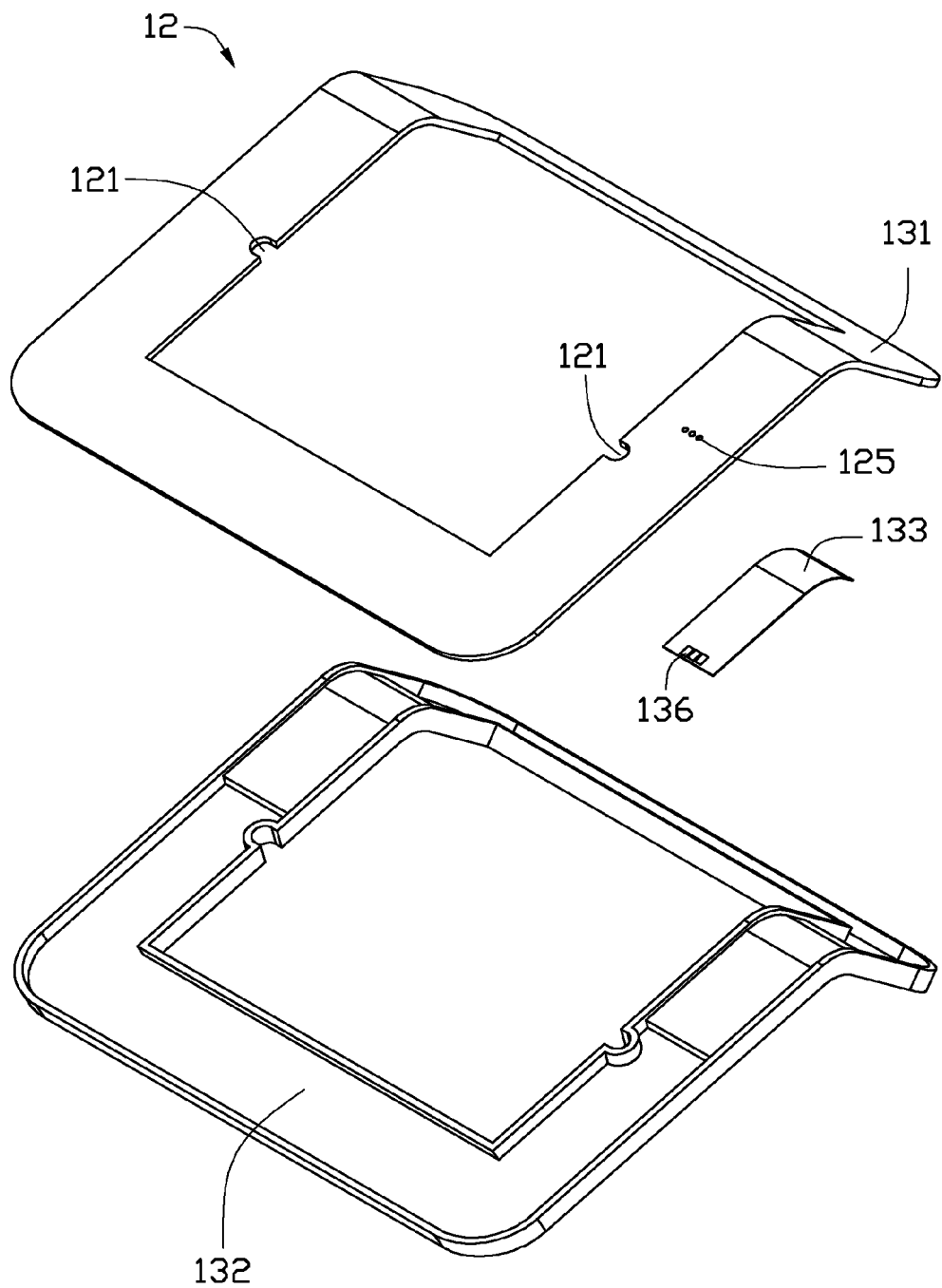
FIG. 4 is an exploded view of the base of the wireless telephone in FIG. 1.

Referring also to FIG. 4, the support 12 includes a first frame 131, a second frame 132, and an antenna 133. The first frame 131 and the second frame 132 are made of electromagnetic interference (EMI) shielding materials. The first frame 131 opposes the base unit 11. The first frame 131 defines a number of through holes 125. The second frame 132 is fixed to the first frame 131. The antenna 133 is fixed between the first frame 131 and the second frame 132. The antenna 133 includes a number of electrically conductive pins 136. The conductive pins 136 are aligned with the through holes 125 correspondingly.

Figure 5:
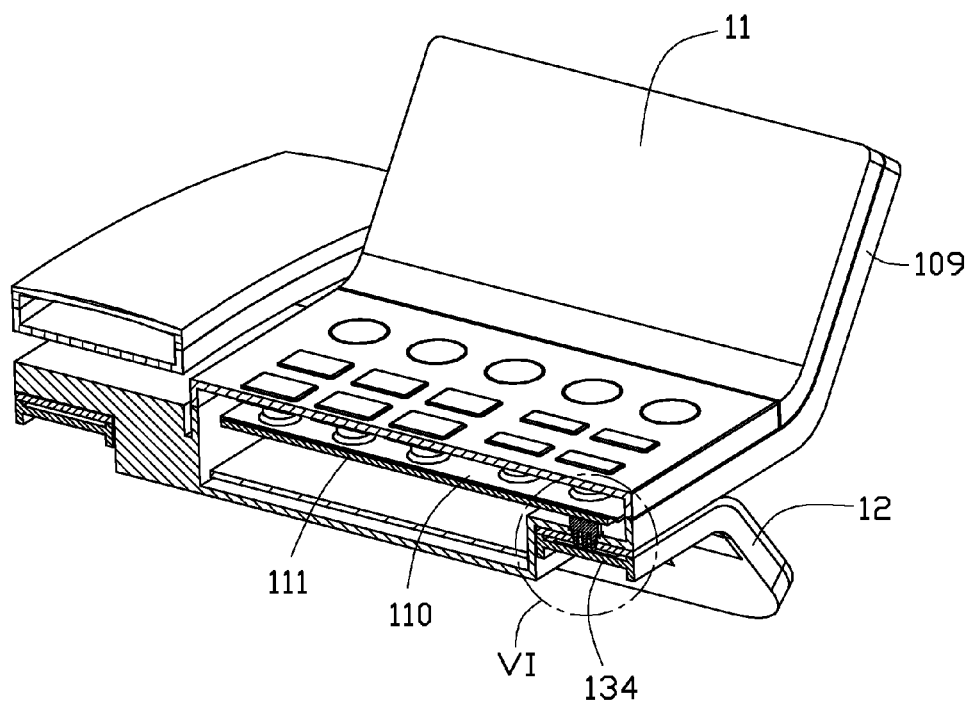
FIG. 5 is cross-sectional view of the wireless telephone in FIG. 1, taken along line V-V of FIG. 1.
Figure 6:
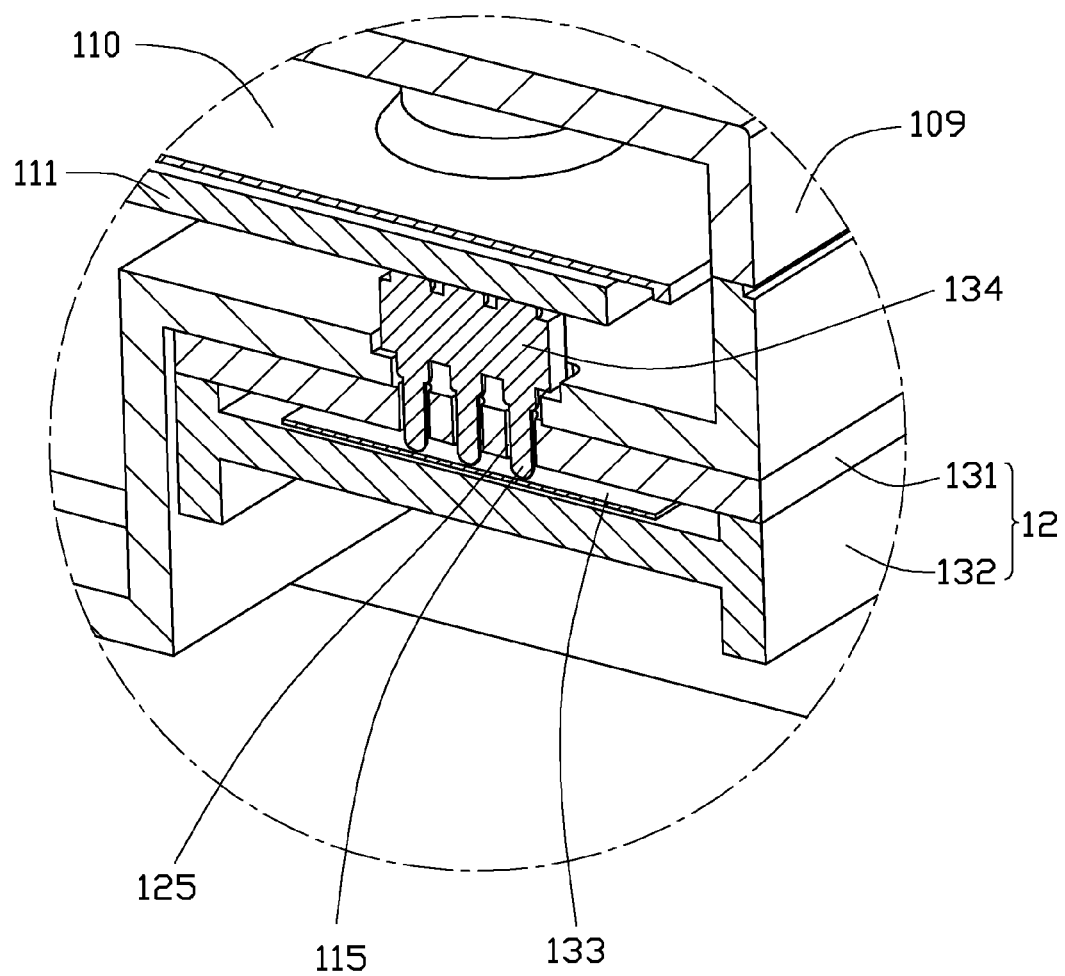
FIG. 6 is an enlarged view of the cut away section VI of the wireless telephone in FIG. 5.

Referring to FIGS. 5 and 6, the base unit 11 includes a shell 109, a keypad module 110, and a circuit board 111. The circuit board 111 is positioned below the keypad module 110. A connector 134 is electrically connected to the circuit board 111. The connector 134 includes a number of electrically conductive terminals 115. The conductive terminals 115 protrude out of the base unit 11, and pass through the through holes 125 to contact the conductive pins 136. The base unit 12 can thus communicate wirelessly through the antenna 133. In this way, the antenna 133 is separated from the base unit 11, which can avoid EMI between the antenna 133 and the electronic components on the circuit board 111.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A wireless telephone comprising:
a support comprising an antenna and defining a plurality of through holes, the antenna comprising a plurality of electrically conductive pins that are aligned with the plurality of through holes; and
a base unit supported by the support and comprising a plurality of protruding, conductive terminals that respectively pass through the plurality of through holes and contact the plurality of electrically conductive pins, thereby allowing signals to be transmitted through the antenna.

2. The wireless telephone of claim 1, wherein the support comprise a first frame opposes the base unit and a second frame fixed to the first frame, the antenna is fixed between the first frame and the second frame, the through holes are defined in the first frame.

3. The wireless telephone of claim 2, wherein the first frame and the second frame are made of electromagnetic interference shielding materials.

4. The wireless telephone of claim 1, wherein the base unit is formed with a platform protruding from its bottom, the support defines a receiving space for receiving the platform.

5. The wireless telephone of claim 4, wherein two opposite sides of the platform respectively comprise a protrusion, the support defines two opposite recesses in opposite sidewalls of the receiving space, the two protrusions are received in the two recesses to mount the base unit to the support.

* * * * *